US009254236B2

(12) United States Patent
Nicholson et al.

(10) Patent No.: US 9,254,236 B2
(45) Date of Patent: Feb. 9, 2016

(54) REMOVABLE BAG ASSEMBLY AND SYSTEM FOR ROLLATORS, WALKERS, AND OTHER MOBILITY-ASSISTANCE APPARATUS

(71) Applicant: Drive Medical Design & Mfg., Port Washington, NY (US)

(72) Inventors: Clay Nicholson, Brooklyn, NY (US); Harvey Diamond, Armonk, NY (US)

(73) Assignee: Drive Medical Design & Manufacturing, Port Washington, NY (US)

( * ) Notice: Subject to any disclaimer, the term of this patent is extended or adjusted under 35 U.S.C. 154(b) by 0 days.

(21) Appl. No.: 14/295,731

(22) Filed: Jun. 4, 2014

(65) Prior Publication Data

US 2015/0351994 A1 Dec. 10, 2015

(51) Int. Cl.
*B62B 3/00* (2006.01)
*A61H 3/00* (2006.01)
*A61H 3/04* (2006.01)

(52) U.S. Cl.
CPC .. *A61H 3/00* (2013.01); *A61H 3/04* (2013.01); *A61H 2003/002* (2013.01)

(58) Field of Classification Search
CPC ..... A61H 3/00; A61H 3/04; A61H 2003/002; A61H 2003/003; A61H 2003/004; A61H 2201/0161; A45C 7/00; A45C 7/0077
See application file for complete search history.

(56) References Cited

U.S. PATENT DOCUMENTS 4,800,911 A * 1/1989 Endres .................... A61H 3/00 135/67
4,953,887 A * 9/1990 Takahashi ................ B62B 9/26 280/47.38
5,046,748 A * 9/1991 Oat-Judge ................ A61H 3/04 188/5
5,813,582 A * 9/1998 Wright ..................... A61G 5/10 224/407
6,651,994 B2 * 11/2003 Hallgrimsson .......... A61G 5/08 135/67
7,001,313 B1 * 2/2006 Crnkovich ............... A61H 3/04 135/67
7,052,030 B2 * 5/2006 Serhan ..................... A61H 3/04 280/304.1
7,073,801 B2 * 7/2006 Sanders ................... A61H 3/04 280/47.4
7,090,239 B2 * 8/2006 Yoshie ...................... B62B 9/26 280/47.38
7,789,413 B2 * 9/2010 Hei ........................ A45C 13/14 280/33.992
8,066,291 B2 * 11/2011 Cagan ................... B62B 3/1428 280/33.991
8,083,239 B2 12/2011 Liu
8,746,265 B2 * 6/2014 Nilsson .................... A61H 3/04 135/66
2007/0164528 A1 * 7/2007 Morath .................... A61H 3/04 280/87.05
2009/0285509 A1 11/2009 Giaquinto

* cited by examiner

*Primary Examiner* — James M Dolak
(74) *Attorney, Agent, or Firm* — Carter, DeLuca, Farrell & Schmidt, LLP

(57) ABSTRACT

A system including a mobility-assistance apparatus and a bag. The apparatus includes one or more shafts. The shaft defines a lumen, has an open end in communication with the lumen, and defines a longitudinally-extending slot in communication with the lumen. An end cap is releasably engagable with the open end to enclose the lumen of the shaft. The bag includes a body and one or more attachment members coupled to the bag via flange portion(s). The attachment member is configured for receipt within the lumen of the shaft with the flange portion extending through the slot of the shaft. The attachment member is insertable into and removable from the lumen of the shaft when the end cap is disengaged from the open end of the shaft, and is retained within the lumen of the shaft when the end cap is engaged with the open end of the shaft.

11 Claims, 5 Drawing Sheets

REMOVABLE BAG ASSEMBLY AND SYSTEM FOR ROLLATORS, WALKERS, AND OTHER MOBILITY-ASSISTANCE APPARATUS

BACKGROUND

1. Technical Field

The present disclosure relates to removable bags capable of being removably secured to a support and, more particularly, to a removable bag assembly and removable bag system configured for use with a rollator, walker, or other mobility-assistance apparatus.

2. Background of Related Art

Rollators, walkers, and other mobility-assistance apparatus facilitate an individual's ability to walk and be independently mobile by providing stabilization, support, and/or reducing the burden on the individual's lower body.

In addition to the primary function of aiding mobility, rollators, walkers, and other mobility-assistance apparatus have more recently incorporated additional features that facilitate the usability, transportability, and/or convenience of such mobility-assistance apparatus. For example: a folding mechanism may be provided to facilitate the transport of the apparatus, e.g., to fit in a vehicle; a seat may be incorporated to enable the individual to be seated when stationary, e.g., to rest or once the individual's destination has been reached; and a bag may be provided to allow the user to store personal items, e.g., clothing, medication, food and drink, purchased goods, etc.

SUMMARY

In accordance with the present disclosure, a system is provided including a mobility-assistance apparatus and a bag that is removably engagable with the mobility-assistance apparatus. The mobility-assistance apparatus includes one or more shafts. A portion or the entirety of each shaft defines a lumen extending longitudinally therethrough, has an open end in communication with the lumen, and defines a longitudinally-extending slot in communication with the lumen. The mobility-assistance apparatus further includes one or more end caps, each end cap corresponding to one of the shafts and being releasably engagable with the open end of that shaft to enclose the lumen thereof. The bag includes a body portion and one or more attachment members. Each attachment member is coupled to the bag via a flange portion. Each attachment member is configured for receipt within the lumen of one of the shafts with the flange portion extending through the slot of the shaft. The attachment member(s) of the bag is insertable into and removable from the lumen(s) of the shaft(s) when the end cap(s) is disengaged from the shaft(s). On the other hand, the attachment member(s) is retained within the lumen(s) of the shaft(s) when the end cap(s) is engaged with the shaft(s).

In embodiments, the mobility-assistance apparatus is a rollator. The rollator may be collapsible. Alternatively, the system may include any other suitable mobility-assistance apparatus, e.g., a walker, wheelchair, etc. Further, the system may include a bag and a plurality of different mobility-assistance apparatus, each of which is configured for releasably engaging the bag thereon.

In embodiments, the mobility-assistance apparatus including a pair of spaced-apart shafts and the bag includes an attachment member at either end thereof. In such embodiments, each attachment member is configured for releasable engagement with one of the shafts to suspend the bag therebetween.

In embodiments, the end cap is tethered to the shaft.

In embodiments, the shaft defines a locking track and the end cap includes a locking nub configured for engagement within the locking track to lock the end cap in engagement with the open end of the shaft. More specifically, the end cap may be configured for engagement with the open end of the shaft via a bayonet coupling.

In embodiments, the bag includes a body portion and first and second side portions. The side portions may be engaged to the body portion via stitching that provides structure to the bag. The bag may further include a top portion and a zipper assembly associated with the top portion for providing access to an interior of the bag and enclosing the interior of the bag.

In embodiments, the shaft and attachment member both define generally tubular configurations.

A method of releasably coupling a bag to a mobility-assistance apparatus is also provided in accordance with the present disclosure. The method includes removing an end cap from a shaft of the mobility apparatus to expose a lumen extending through the shaft, inserting an attachment member of the bag into the lumen of the shaft, and replacing the end cap to retain the attachment member of the bag within the lumen of the shaft, thereby coupling the bag to the mobility apparatus.

In embodiments, the method further includes removing the end cap from the shaft, withdrawing the attachment member from the lumen of the shaft, and replacing the end cap, thereby disengaging the bag from the mobility-assistance apparatus.

In embodiments, removing the end cap includes disengaging a bayonet coupling between the end cap and the shaft, and replacing the end cap includes engaging the end cap with the shaft via a bayonet coupling.

In embodiments, the mobility-assistance apparatus is a rollator and the bag is coupled to a frame of the rollator. More specifically, frame may include include first and second spaced-apart shafts having end caps. In such embodiments, the bag includes first and second attachment members, and the method includes removing both end caps, inserting each attachment member into one of the end caps, and replacing the end caps to retain the attachment members of the bag within the lumen of the shaft, thereby coupling the bag to the rollator in suspension between the shafts.

BRIEF DESCRIPTION OF THE DRAWINGS

The present disclosure is described with reference to the accompanying drawing figures, wherein like references characters identify similar or identical elements.

DETAILED DESCRIPTION

Referring generally to FIGS. 1-7, a system 10 provided in accordance with the present disclosure generally includes a mobility-assistance apparatus, e.g., rollator 100, and a removable bag assembly 200 configured for releasable engagement with rollator 100. Although system 10 is detailed herein with respect to rollator 100, it is envisioned that removable bag assembly 200 be configured for releasable engagement with any other suitable mobility-assistance apparatus. Accordingly, the description of rollator 100 hereinbelow is provided generally for the purpose of understanding; it is understood that rollator 100 may be configured similarly to and/or may include any of the feature(s) of known mobility-assistance apparatus and that the use of removable bag assembly 200 in conjunction with any other suitable mobility-assistance apparatus functions in a similar manner as that detailed below with respect to rollator 100, regardless of the particular configuration thereof.

Figure 1:
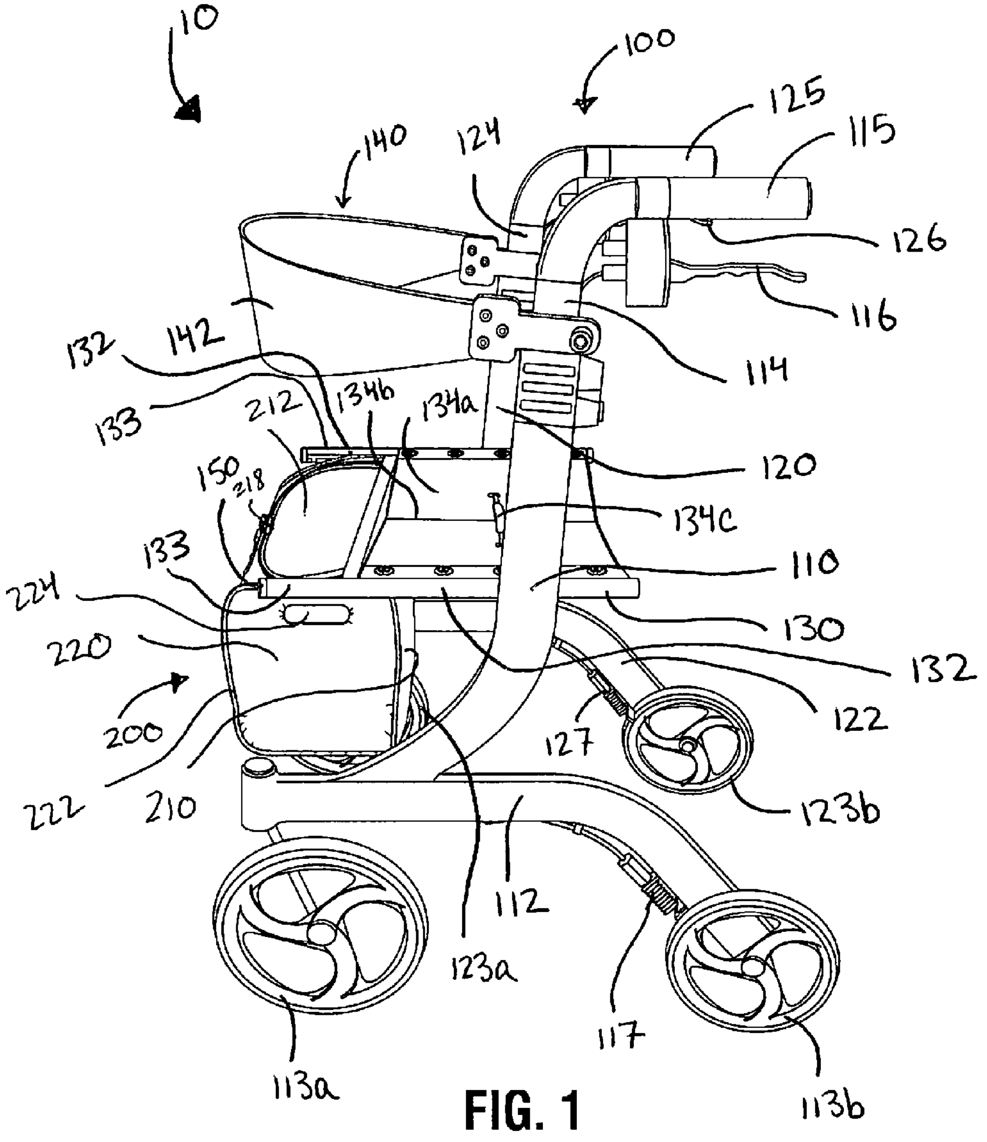
FIG. 1 is a side, perspective view of a removable bag assembly provided in accordance with the present disclosure, shown coupled to a rollator.
Figure 2:
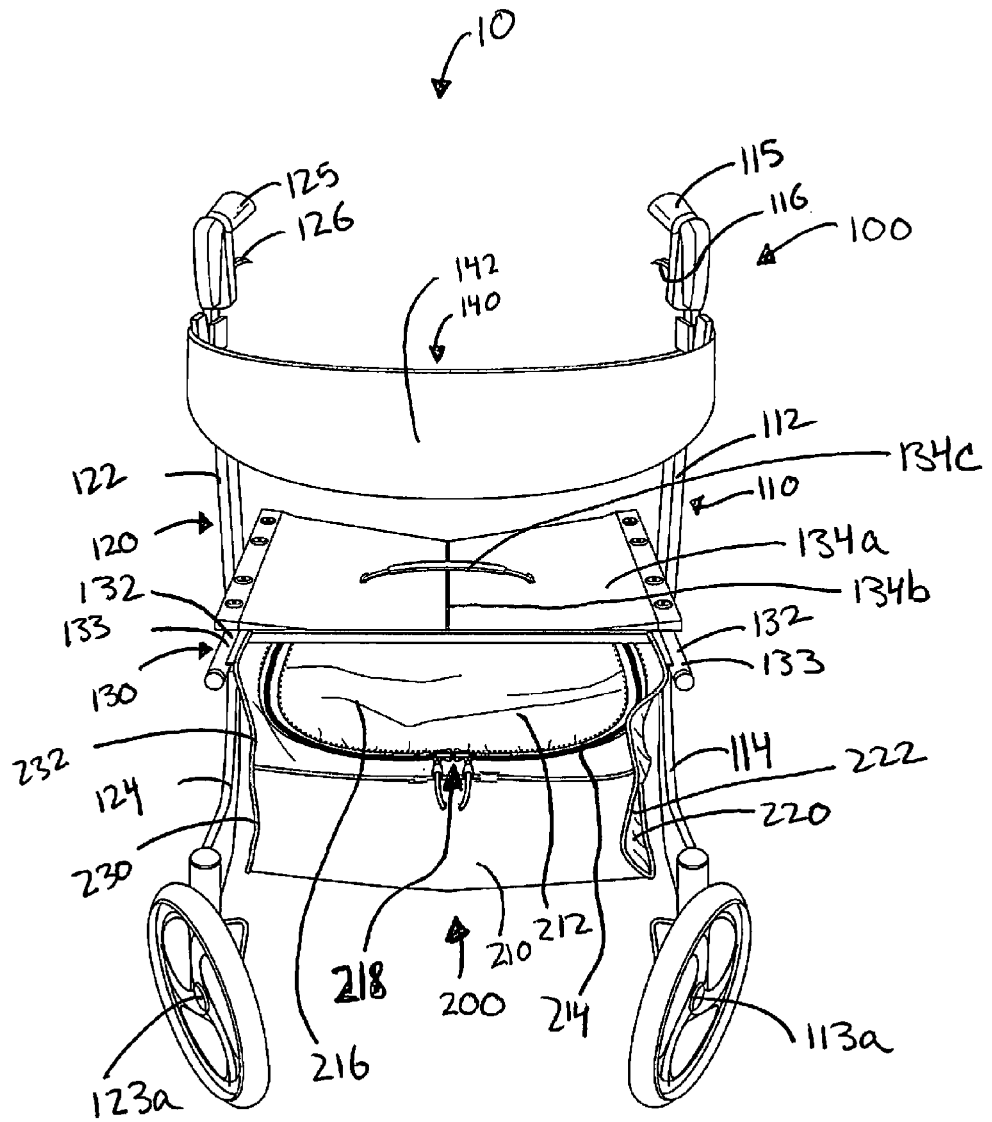
FIG. 2 is a front, perspective view of the removable bag assembly of FIG. 1, shown coupled to the rollator of FIG. 1.

With reference to FIGS. 1 and 2, rollator 100 generally includes a pair of opposed side frame assemblies 110, 120 and a middle frame assembly 130, although other configurations are also contemplated. Each side frame assembly 110, 120 includes a generally horizontal lower portion 112, 122 and a generally vertical upper portion 114, 124. Front and rear wheel assemblies 113*a*, 113*b* and 123*a*, 123*b* are coupled to the respective front and rear ends of lower portions 112, 122 of side frame assemblies 110, 120, respectively. Front wheel assemblies 113*a*, 123*a* may be pivotably coupled to lower portions 112, 122, respectively, to facilitate steering rollator 100 in a desired direction. Handles 115, 125 are coupled to the free ends of upper portions 114, 124 of side frame assemblies 110, 120 for grasping by the use. Braking levers 116, 126 associated with braking mechanisms 117, 127 may be coupled to either or both of handles 115, 125 to enable braking of the rear wheel assemblies 113*b*, 123*b*, respectively, during use. Braking mechanisms 117, 127 may be provided. The braking may be electronic brakes, wheel-lock brakes activated upon deployment of the seat, or any other suitable braking mechanism.

Figure 3:
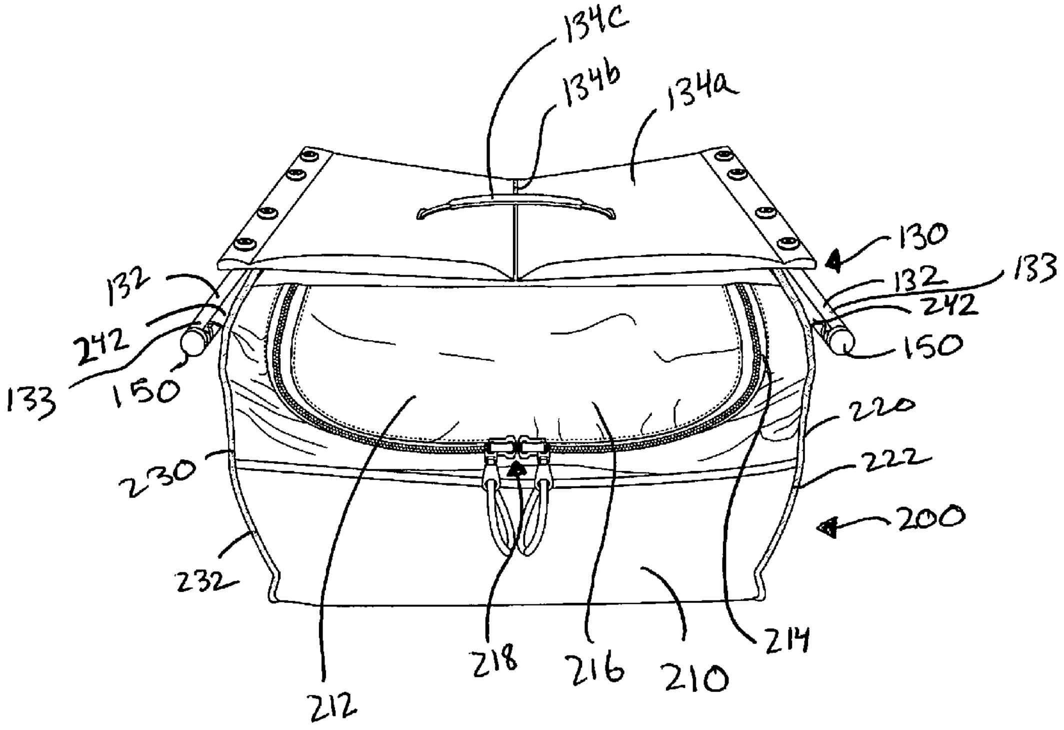
FIG. 3 is a front, perspective view of the removable bag assembly of FIG. 1, shown coupled to the seat assembly of the rollator of FIG. 1.

Continuing with reference to FIGS. 1 and 2, and with additional reference to FIG. 3, middle frame assembly 130 extends between and interconnects opposed side frame assemblies 110, 120. Middle frame assembly 130 generally includes a pair of support shafts 132, each of which is secured to one of the side frame assemblies 110, 120. A seat 134*a* is secured to each of support shafts 132 at opposite sides of seat 134*a* and extends therebetween. Seat 134*a* may be formed from a cushioned, reinforced fabric, or any other suitable material, and defines a living hinge 134*b* extending along a central portion thereof to permit folding of seat 134*a* upon collapse of rollator 100. Middle frame assembly 130 may further include collapsible cross-bracing (not specifically shown) or other suitable structure(s) that enables middle frame 130 to collapse from an expanded condition, shown in FIGS. 1 and 2, wherein opposed side frame assemblies 110, 120 are spaced-apart from one another and seat 134*a* is presented, to a collapsed condition, wherein opposed side frame assemblies 110, 120 are disposed in close proximity to one another and seat 134*a* is folded therebetween. Further, a handle 134*c* is provided spanning living hinge 134*b* and attached to seat 134*a* on either side of living hinge 134*b* such that grasping handle 134*c* and pulling handle 134*c* away from seat 134*a* serves to fold seat 134*a* and aid in the collapse of opposed side frame assemblies 110, 120 from the expanded condition to the collapsed condition. Additionally, handle 134*c* may be coupled to a latching mechanism (not explicitly shown) such that, upon pulling handle 134*c*, the latch mechanism is disengaged to permit collapsing of rollator 100 towards the collapsed configuration. Upon sufficient expansion of rollator 100, on the other hand, the latch mechanism is engaged to lock rollator 100 in the expanded configuration.

Rollator 100 may further include a back support 140 fixedly or removably engaged to opposed side frame assemblies 110, 120 at opposite ends of back support 140. Body portion 142 of back support 140 may be curved and/or otherwise configured to comfortably support the back of a user sitting on seat 134*a*.

Referring still to FIGS. 1-3, as mentioned above, support shafts 132 of middle frame assembly 130 are secured to side frame assemblies 110, 120. Support shafts 132 are spaced-apart from one another, extend in generally parallel orientation relative to one another, and define substantially hollow, tubular configurations. As also mentioned above, seat 134*a* is suspended between support shafts 132. However, a portion 133 of each support shaft 132 extends forwardly from seat 134*a*. These portions 133 of support shafts 132, as detailed below, are configured to receive and releasably engage removable bag assembly 200 such that removable bag assembly 200 can be secured to rollator 100 in a position where removable bag assembly 200 does not interfere with the operation of rollator 100 or a user sitting on seat 134*a* and such that removable bag assembly 200 can be readily secured to and removed from rollator 100. Support shafts 132 are substantially similar to one another and, thus, support shafts 132 will be collectively referenced below in the singular, keeping in mind that the below description applies similarly to both support shafts 132.

Figure 5:
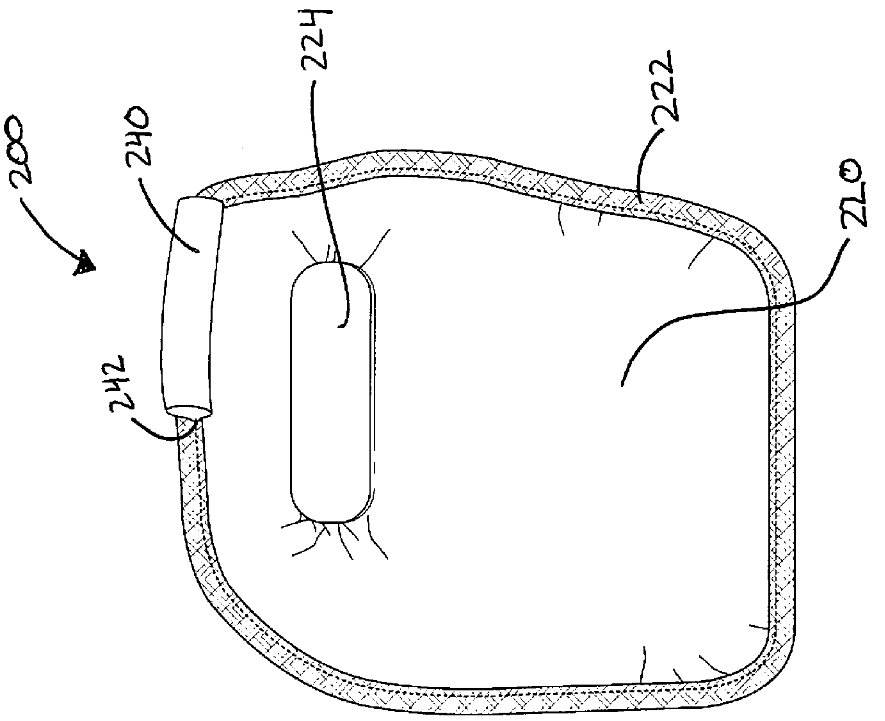
FIG. 5 is a side view of one of the sides of the removable bag assembly of FIG. 1.
Figure 4:
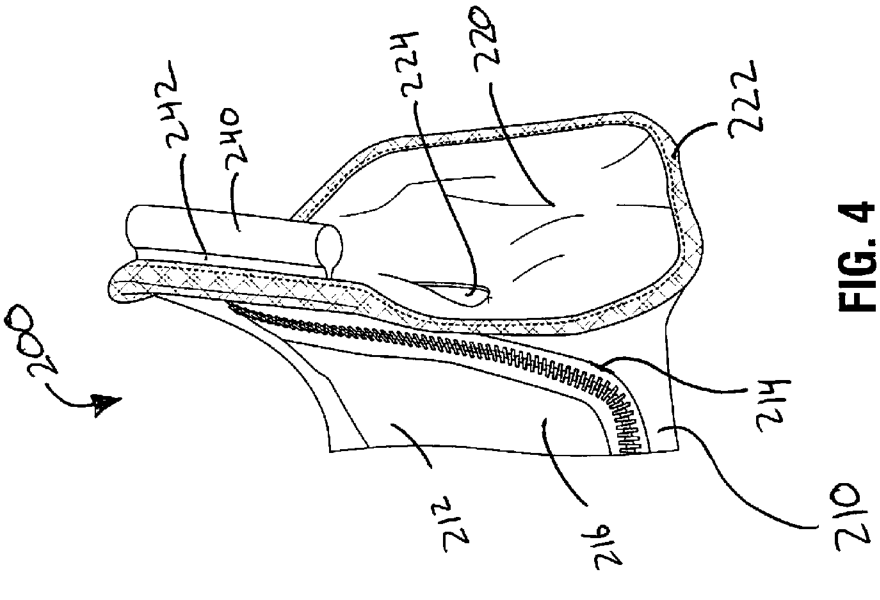
FIG. 4 is a front, perspective view of one of the sides of the removable bag assembly of FIG. 1.

Turning now to FIGS. 3-5, removable bag assembly 200 is formed from a durable fabric material, or other suitable material, e.g., open mesh, and defines a generally rectangular configuration having a body portion 210 and a pair of side panels 220, 230. Body portion 210 defines a top section 212 having a cut-line that divides top section 212 into a generally U-shaped outer member 214 and an inner member 216 shaped complementary to the U-shaped outer member 214. Outer and inner members 214, 216 are releasably securable with one another, along the cut-line, via a zipper assembly 218 having a zipper and cooperating track portions on the inner edge of outer member 214 and the outer edge of inner member 216. As such, access to the interior of removable bag assembly 200 can be provided for insertion/removal of items, and removable bag assembly 200 may be zippered close to retain any items therein using zipper assembly 218. Additional or different closure mechanisms are also contemplated.

Continuing with reference to FIGS. 3-5, side panels 220, 230 are joined to body portion 210 about the outer peripheral edges thereof via large-gauge, heavy-duty, and/or multi-layered fabric stitching 222, 232 to both fully enclose removable bag assembly 200 and provide structure to removable bag assembly 200 without the need for additional framing or support structures. Side panels 220, 230 may further define elongate cut-outs 224 that act as handles to facilitate grasping, carrying, and manipulating removable bag assembly 200. Other suitable handles and/or carrying straps (not explicitly shown) are also contemplated.

Referring still to FIGS. 3-5, side panels 220, 230 each further include a tubular attachment member 240 secured thereto towards top section 212 of body portion 210. Tubular attachment members 240 are coupled to the reinforced fabric stitchings 222, 232 of side panels 220, 230, respectively, via flange portions 242 formed of a relatively thin layer or layers of fabric. As such, the outer cylindrical surfaces of tubular attachment members 240 are substantially exposed and unabated, except for the extension of flange portion 242 therefrom. Tubular attachment members 240 may be formed from a stuffed fabric or other suitable material that defines a structured tubular member with some degree of flexibility. Alternatively, tubular attachment members 240 may be rigid or semi-rigid. As detailed below, each tubular attachment member 240 is configured to releasably couple to the portion 133 of one of the support shafts 132 of middle frame assembly 130 of rollator 100 to releasably couple removable bag assembly 200 with rollator 100 (see FIG. 1). Similarly as with support shafts 132, tubular attachment members 240 are substantially similar to one another and, thus, tubular attachment members 240 will be collectively referenced below in the singular, keeping in mind that the below description applies similarly to both tubular attachment members 240.

Figure 7:
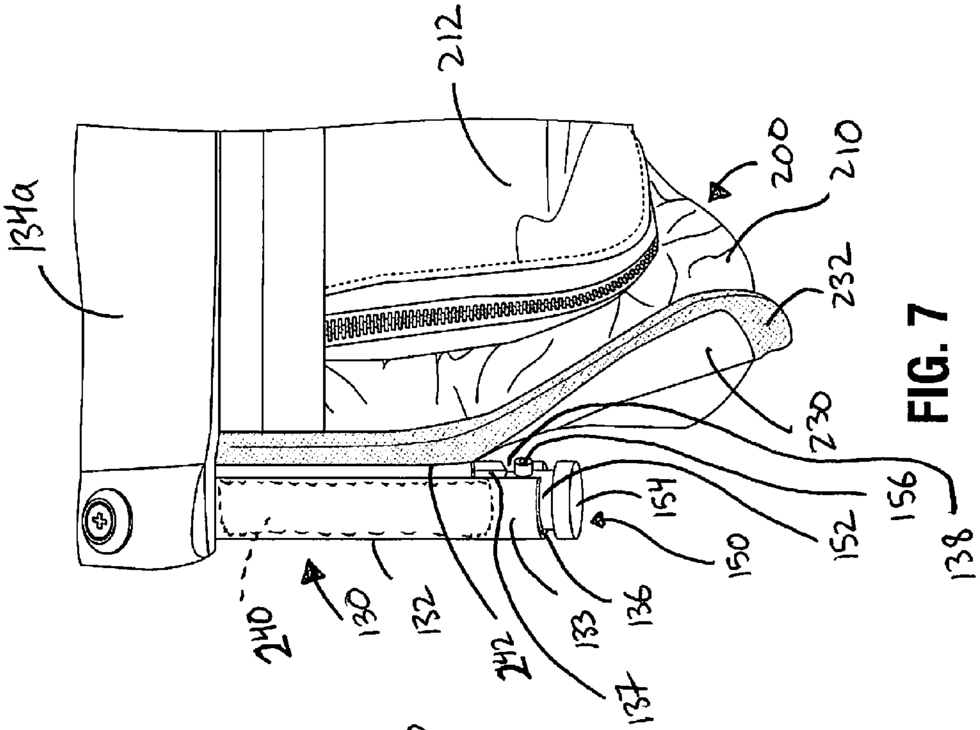
FIG. 7 is a partial, perspective view of the removable bag assembly and rollator of FIG. 1, illustrating the components thereof transitioning to a locked condition for retaining the removable bag in engagement with and suspending the removable bag from the rollator.
Figure 6:
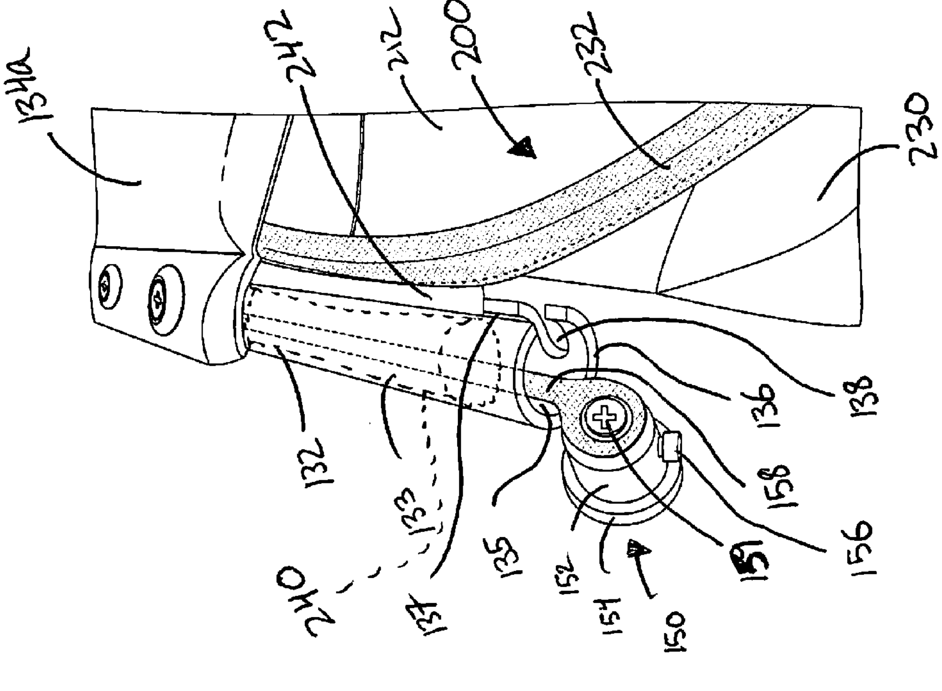
FIG. 6 is a partial, perspective view of the removable bag assembly and rollator of FIG. 1, illustrating the components thereof in an unlocked condition for allowing engagement/disengagement of the removable bag assembly to/from the rollator.

Turning to FIGS. 6 and 7, at least portion 133, or the entirety, of support shaft 132 has a hollow interior defining a lumen 135 extending longitudinally therethrough. The open end 136 of portion 133 of support shaft 132 provides access to lumen 135. Further, a longitudinal slot 137 in communication with lumen 135 and open end 136 is defined through the portion 133 of support shaft 132. Slot 137 defines a locking track 138 that include at least one angled and/or curved segment that is angled and/or curved relative to slot 137, e.g., to define a female bayonet connector. The importance of slot 137 and locking track 138 will be detailed below.

Continued with reference to FIGS. 6 and 7, an end cap 150 is releasably engagable within the open end 136 of portion 133 of each support shaft 132. Each end cap 150 includes a neck 152 configured for slidable receipt within lumen 135, and a head 154 configured to abut open end 136 of portion 133 of support shaft 132. A locking nub 156, e.g., a male bayonet connector, disposed on the outer peripheral surface of the neck 152 of each end cap 150 is configured for engagement within locking track 138, as will be detailed below. Alternatively, screw-fit couplings, friction-fit couplings, or other suitable couplings are contemplated.

Each end cap 150 is tethered to the corresponding support shaft 132 via a connecting member 158, e.g., a cord, string, tube, chain, etc. Connecting members 158 may be secured to the corresponding end caps 150 in compression-fit engagement therewith via a securing screw 159, although other suitable mechanisms to accomplish the same are also contemplated. As can be appreciated, connecting members 158 maintain end caps 150 in proximity to its corresponding support shaft 132, thereby inhibiting end caps 150 from being lost or misplaced. Further, connecting members 158 are resilient, e.g., formed from a resilient elastomeric material, and biased towards the corresponding support shaft 132 to facilitate retention of end caps 150 within support shafts 132 and locking engagement of end caps 150 therein. Alternatively, end caps 150 may be tethered to another part of rollator 100, to removable bag assembly 200, or to any other suitable component. End caps 150 are substantially similar to one another and, thus, will be detailed below in the singular.

In order to insert and lock end cap 150 within support shaft 132, neck 152 of end cap 150 is inserted into lumen 135 of support shaft 132 such that locking nub 156 is aligned with locking track 138. Once this position has been achieved, end cap 150 is rotated relative to support shaft 132 such that locking nub 156 travels through locking track 138 and is seated at the closed end thereof. As mentioned above, locking track 138 may be configured to establish a bayonet engagement between locking track 138 and locking nub 156. Further, the resilient bias of end cap 150 via connecting member 158 biases locking nub 156 towards the closed end of locking track 138, thereby locking end cap 150 in engagement with support shaft 132. Other releasable locking mechanisms, e.g., threaded connections, magnets, snap-fit connections, friction-fit connections, etc., are also contemplated. Removal of end cap 150 is effected in the opposite manner, e.g., via rotating and translating end cap 150 such that locking nub 156 is moved along and ultimately out of locking track 138, thus permitting withdrawal of end cap 150 from support shaft 132. As an alternative to tethering end caps 150, end caps 150 may be coupled to support shafts 132, rollator 100, removable bag assembly 200, etc., via a hinge, pin-slot engagement, or other suitable coupling that allows end caps 150 to be moved between locked and unlocked positions for retaining removable bag assembly 200 on rollator 100 and for insertion/removal of removable bag assembly 200 to/from rollator 100, respectively.

Referring still to FIGS. 6 and 7, the releasable coupling of removable bag assembly 200 from rollator 100 is described. Initially, in order to permit coupling of removable bag assembly 200 to rollator 100, end cap 150 is removed from support shaft 132, as detailed above. The removal of end cap 150 exposes the open end 136 of portion 133 of support shaft 132, thus providing access to lumen 135. With lumen 135 exposed, tubular attachment member 240 may be inserted into lumen 135 of portion 133 of support shaft 132, while flange portion 242 extends through slot 137. Although flange portion 242 is capable of extending through slot 137 due to its relatively thin configuration, slot 137 is sufficiently narrow to inhibit passage of tubular attachment member 240 therethrough. Thus, tubular attachment member 240 is retained within support shaft 132 and is only insertable into and removable from support shaft 132 via open end 136 when end cap 150 is removed.

Once tubular attachment member 240 is inserted into lumen 135 of support shaft 132, end cap 150 may once again be locked onto the open end 136 of support shaft 132 via the engagement of locking nub 156 within locking track 138, similarly as detailed above. In this configuration, tubular attachment member 240 is retained within portion 133 of support shaft 132, thereby securing removable bag assembly 200 to rollator 100 suspended between support shafts 132 of middle frame assembly 130. Removable bag assembly 200 may be removed from rollator 100 in the opposite manner as detailed above, e.g., via removing end caps 150, withdrawing tubular attachment members 240 from support shafts 132, and replacing end caps 150.

The above description, disclosure, and figures should not be construed as limiting, but merely as exemplary of particular embodiments. It is to be understood, therefore, that the disclosure is not limited to the precise embodiments described, and that various other changes and modifications may be effected by one skilled in the art without departing from the scope or spirit of the present disclosure. Additionally, persons skilled in the art will appreciate that the features illustrated or described in connection with one embodiment may be combined with those of another, and that such modifications and variations are also intended to be included within the scope of the present disclosure. Therefore, the above description should not be construed as limiting, but merely as exemplifications of particular embodiments.

What is claimed is:

1. A system, comprising:

a mobility-assistance apparatus, including:

at least one shaft, at least a portion of the shaft defining a lumen extending longitudinally therethrough, the shaft having an open end in communication with the lumen and a longitudinally-extending slot in communication with the lumen; and at least one end cap releasably engagable with the open end of the shaft to enclose the lumen of the shaft; and a bag releasably engagable with the mobility-assistance apparatus, the bag including a body portion and at least one attachment member, the attachment member coupled to the bag via a flange portion, the attachment member configured for receipt within the lumen of the shaft with the flange portion extending through the slot of the shaft, wherein the attachment member of the bag is insertable into and removable from the lumen of the shaft when the end cap is disengaged from the open end of the shaft, and wherein the attachment member is retained within the lumen of the shaft when the end cap is engaged with the open end of the shaft.

2. The system according to claim 1, wherein the mobility-assistance apparatus is a rollator.

3. The system according to claim 2, wherein the rollator is collapsible.

4. The system according to claim 1, wherein the at least one support shaft of the mobility-assistance apparatus includes a pair of spaced-apart support shafts, wherein the at least one attachment member of the bag includes a respective attachment member at either end thereof, and wherein each attachment member is configured for releasable engagement with one of the support shafts to suspend the bag therebetween.

5. The system according to claim 1, wherein the end cap is tethered to the shaft.

6. The system according to claim 1, wherein the shaft defines a locking track and wherein the end cap includes a locking nub configured for engagement within the locking track to lock the end cap in engagement with the open end of the shaft.

7. The system according to claim 6, wherein the end cap is configured for engagement with the open end of the shaft via a bayonet coupling.

8. The system according to claim 1, wherein the body portion of the bag includes first and second side portions.

9. The system according to claim 8, wherein the side portions are engaged to the body portion via stitching that provides structure to the bag.

10. The system according to claim 8, wherein the bag further includes a top portion and a zipper assembly associated with the top portion for providing access to an interior of the bag and enclosing the interior of the bag.

11. The system according to claim 1, wherein the shaft and attachment member both define generally tubular configurations.

* * * * *